United States Patent [19]

McFadden

[11] Patent Number: 4,654,398
[45] Date of Patent: Mar. 31, 1987

[54] THERMOSET ACRYLIC COATINGS HAVING IMPROVED GLOSS RETENTION

[75] Inventor: Russell T. McFadden, Freeport, Tex.

[73] Assignee: The Dow Chemical Company, Midland, Mich.

[21] Appl. No.: 779,001

[22] Filed: Sep. 23, 1985

[51] Int. Cl.[4] .......................... C08F 20/26; C08L 33/14
[52] U.S. Cl. ..................................... 524/512; 524/315; 524/317; 524/361; 524/364; 524/376; 524/759; 524/761; 524/765; 524/770; 524/773; 524/850; 524/853; 528/854; 526/318.42; 525/162
[58] Field of Search ............... 524/853, 854, 850, 812, 524/364, 759, 761, 765, 770, 773; 526/318.42, 318.1, 318.3, 320

[56] References Cited

U.S. PATENT DOCUMENTS

| | | | |
|---|---|---|---|
| 2,686,172 | 8/1954 | Wolf | 526/320 |
| 3,542,741 | 11/1970 | Hartmann et al. | 260/77.5 |
| 3,832,217 | 8/1974 | Sato et al. | 117/74 |
| 3,844,993 | 10/1974 | Miller | 260/22 TN |
| 3,883,453 | 5/1975 | Takanashi | 524/854 |
| 3,941,912 | 3/1976 | Tajima et al. | 428/537 |
| 4,237,038 | 12/1980 | Pampouchidis et al. | 260/29.2 TN |
| 4,435,556 | 5/1984 | Masler | 526/318.42 |
| 4,440,894 | 4/1984 | Zychowski | 524/765 |
| 4,501,868 | 2/1985 | Bouboulis | 526/320 |
| 4,530,957 | 7/1985 | Theodore | 524/853 |
| 4,532,294 | 7/1985 | Bouboulis | 524/853 |

FOREIGN PATENT DOCUMENTS 2460329  7/1976  Fed. Rep. of Germany .......... 526/318.42
54-126054  9/1979  Japan .

*Primary Examiner*—C. Warren Ivy
*Attorney, Agent, or Firm*—James G. Carter

[57] ABSTRACT

The weatherability of acrylic coatings is enhanced by incorporating into the acrylic polymer hydroxybutyl acrylate or hydroxybutyl methacrylate.

28 Claims, No Drawings

THERMOSET ACRYLIC COATINGS HAVING IMPROVED GLOSS RETENTION

BACKGROUND OF THE INVENTION

The present invention pertains to acrylic polymers containing hydroxybutyl acrylate and to coatings prepared therefrom.

Thermoset acrylic coatings have been employed in the automobile industry for top coatings on automobiles. While these coatings are very durable and withstand extreme variations in temperature and moisture environments, there is a need to improve their weatherability in terms of gloss retention.

The present invention provides a method for improving the gloss retention of thermoset acrylic coatings by replacing at least a portion of the hydroxy functional component with hydroxybutyl acrylate or hydroxybutyl methacrylate or a combination thereof.

SUMMARY OF THE INVENTION

One aspect of the present invention pertains to an improvement in a curable polymer resulting from polymerizing a composition comprising (I) from about 40 to about 80, preferably from about 65 to about 75 percent by weight based on the combined weight of components (I) and (II) of a monomer composition consisting essentially of
  (A) from about 0 to about 40, preferably from about 0 to about 14, percent by weight of at least one polymerizable monoethylenically unsaturated ester of a saturated aliphatic or aromatic monocarboxylic acid;
  (B) from about 30 to about 60, preferably from about 40 to about 54, percent by weight of at least one polymerizable alkyl or aryl ester of a monoethylenically unsaturated monocarboxylic acid;
  (C) from about 10 to about 40, preferably from about 25 to about 39, percent by weight of at least one polymerizable hydroxyalkyl ester of a monoethylenically unsaturated monocarboxylic acid;
  (D) from about zero to about 3, preferably from about 1 to about 2, percent by weight of at least one polymerizable monoethylenically unsaturated monocarboxylic acid;
  (E) from about zero to about 15, preferably from about zero to about 14, percent by weight of acrylonitrile, methacrylonitrile or mixture thereof;
  (F) from about zero to about 20, preferably from about 0 to about 14, percent by weight of at least one polymerizable alkyl or aryl ester of a monoethylenically unsaturated dicarboxylic acid; and
  (G) from about zero to about 50, preferably from about 20 to about 34, percent by weight of at least one polymerizable monoethylenically unsaturated aromatic monomer; and
(II) from about 20 to about 60, preferably from about 25 to about 35 percent by weight based on the combined weight of components (I) and (II) of a suitable solvent or mixture of solvents; and wherein the improvement resides in employing 2-hydroxybutyl acrylate or 2-hydroxybutyl methacrylate or a combination thereof as at least a portion of component (C) in an amount such that at least about 75, preferably about 100, equivalent percent of the hydroxyl groups contained in component (C) is derived from hydroxybutyl acrylate, hydroxybutyl methacrylate or a combination thereof.

Another aspect of the present invention pertains to an acrylic coating composition comprising (A) one or more of the aforementioned curable polymer compositions and (B) a curing quantity of one or more curing agents for component (A).

Another aspect of the present invention pertains to an article coated with one or more layers of the aforementioned acrylic coating compositions.

DETAILED DESCRIPTION OF THE INVENTION

The acrylic polymers of the present invention can be prepared by polymerizing a mixture of the monomers in the presence of a suitable catalyst or mixture of catalysts and in the presence of a suitable solvent or mixture of solvents. The temperature can be from about 70° C. to about 165° C., preferably from about 125° C. to about 150° C.

For the purposes of this application, the terms "aromatic" and "aryl" shall refer to "the six-carbon ring characteristic of the molecules of all organic compounds of benzene and related series, or the condensed six-carbon rings of naphthalene, anthracene, phenanthrene, etc." as defined by the *CONDENSED CHEMICAL DICTIONARY*, Reinhold Publishing Corp., page 108 for "aromatic nucleus" and page 112 for "aryl".

Suitable polymerizable monoethylenically unsaturated monocarboxylic acids which can be employed herein include, for example, acrylic acid, methacrylic acid, crotonic acid, vinyl benzoic acid, mixtures thereof and the like.

Suitable polymerizable alkyl or aryl esters of monounsaturated monocarboxylic acids which can be employed herein include, for example, ethyl acrylate, ethyl methacrylate, propyl acrylate, propyl methacrylate, butyl acrylate, butyl methacrylate, amyl acrylate, amyl methacrylate, hexyl acrylate, hexyl methacrylate, 2-ethylhexyl acrylate, 2-ethylhexyl methacrylate, mixtures thereof and the like.

Suitable polymerizable monoethylenically unsaturated esters of saturated aliphatic or aromatic monocarboxylic acids which can be employed herein include, for example, vinyl acetate, vinyl propionate, vinyl benzoate, allyl acetate, allyl propionate, allyl benzoate, mixtures thereof and the like.

Suitable hydroxyalkyl esters of monoethylenically unsaturated monocarboxylic acids which can be employed herein include, for example, hydroxyethyl acrylate, hydroxypropyl acrylate, hydroxyethyl methacrylate, hydroxypropyl methacrylate, 2-hydroxybutyl acrylate, 4-hydroxybutyl acrylate, 2-hydroxybutyl methacrylate, mixtures thereof and the like.

Suitable polymerizable alkyl or aryl esters of monoethylenically unsaturated dicarboxylic acids which can be employed herein include, for example, diethyl maleate, dibutyl maleate, diethyl fumarate, dibutyl fumarate, di(2-ethylhexyl)maleate, di(2-ethylhexyl)fumarate, mixtures thereof and the like.

Suitable polymerizable monoethylenically unsaturated aromatic monomers which can be employed herein include, for example, styrene, α-methyl styrene, t-butyl styrene, chlorostyrene, vinyl toluene, mixtures thereof and the like.

Suitable solvents which can be employed herein include, for example, aliphatic esters, alcohols, ketones, aromatic hydrocarbons, $C_8$ to $C_{12}$ aliphatic or cycloaliphatic hydrocarbons, hydroxyethers, glycol ethers, alkoxycarboxylic esters, mixtures thereof and the like. Particularly suitable solvents include, for example, ethyl acetate, propyl acetate, butyl acetate, amyl acetate, octyl acetate, toluene, xylene, methyl ethyl ketone, methyl propyl ketone, methyl butyl ketone, methyl amyl ketone, 1-methoxypropyl-2-acetate, n-butanol, 1-methoxypropyl-2-propionate, 1-methoxypropyl-2-butyrate, 1-methoxy-2-propanol, 2-methoxy-1-propanol, 2-butyoxyethanol, 2-ethoxyethanol, octane, nonane, decane, undecane, dodecane, mixtures thereof and the like.

Suitable polymerization catalysts or initiators which can be employed herein include, for example, organic peroxide and organic azo compounds such as, for example, dicumyl peroxide, t-butyl peracetate, benzoyl peroxide, di-t-butyl peroxide, tertbutylazo(isovaleronitrile) ethyl 3,3-di(t-amylperoxy)butyrate, 2,4-pentanedione peroxide, 1,1'-azobis(cyclohexane carbonitrile), mixtures thereof and the like.

Suitable curing agents which can be employed herein include, for example, melamine-formaldehyde resins, particularly the methylated form, hexamethoxymethyl melamine, or the mixed methylated/butylated forms; urea-formaldehyde resins; or poly(isocyanate) compounds, such as isophorone diisocyanate as the free isocyanate or in the blocked form, mixtures thereof and the like. Particularly suitable curing agents include, for example, hexamethoxymethyl melamine.

The coatings can be cured by heating at temperatures of from about 70° C. to about 150° C., preferably from about 100° C. to about 125° C. in the presence of a suitable catalyst.

The coating compositions of the present invention can be applied to any suitable substrate which can withstand the curing conditions. They are particularly suitable for coating metals, previously coated metals, composite structures such as polyester-fiber glass, epoxy resin-fiber glass, extruded plastic objects having softening points above the bake temperatures and the like.

The coating compositions of the present invention can also contain, if desired, pigments, fillers, dyes, flow and leveling agents, flatting agents, curing catalysts, and the like in any combination.

The following examples are illustrative of the invention but are not to be construed as to limiting the scope thereof in any manner.

EXAMPLE 1

A. Preparation of Polymer

In a conventional glass polymerization vessel was charged 257 g of 2-ethoxyethyl acetate solvent. After heating to reflux temperature (145° C.) with stirring, a mixture consisting of 87.6 g of styrene, 87.6 g of methyl methacrylate, 265 g of butyl acrylate, 142.5 g (1 hydroxy equivalent) of hydroxybutyl acrylate, 29.4 g of acrylic acid and 18 g of tertbutylazo(isovaleronitrile) was added dropwise over a period of 6.75 hours (24,300 s) at 140° C. to 150° C. The mixture was maintained at 150° C. for 5.25 hours (18,900 s) more and then cooled and stored in a suitable container.

The above procedure was repeated substituting one at a time the following hydroxyalkyl acrylate or methacrylate monomers for the hydroxybutyl acrylate.

116.4 g (1 hydroxyl equiv.) of 2-hydroxyethyl acrylate
130.5 g (1 hydroxy equiv.) of 2-hydroxypropyl acrylate
130.5 g (1 hydroxy equiv.) of 2-hydroxyethyl methacrylate
142.5 g (1 hydroxy equiv.) of 2-hydroxypropyl methacrylate The properties of the resulting copolymers are given in the following Table I.

TABLE I

| Hydroxy Alkyl Monomer | Appearance | Viscosity cp/Pa·s | Non-Vol. % | Molecular Wt. Mw[6] | Molecular Wt. Mn[7] |
|---|---|---|---|---|---|
| 2-HEA[1]* | clear, yellow | 5080/5.08 | 70.0 | 9800 | 2400 |
| 2-HPA[2]* | clear, yellow | 3560/3.56 | 69.2 | 6100 | 2200 |
| 2-HBA[3] | clear, yellow | 2860/2.86 | 69.1 | 5700 | 2200 |
| 2-HEMA[4]* | faintly turbid | 5050/5.05 | 70.1 | 5630 | 2180 |
| 2-HPMA[5]* | faintly turbid | 5050/5.05 | 69.8 | 3880 | 1540 |

*Not an example of the present invention
[1] 2-hydroxyethyl acrylate
[2] 2-hydroxypropyl acrylate
[3] 2-hydroxybutyl acrylate
[4] 2-hydroxyethyl methacrylate
[5] 2-hydroxypropyl methacrylate
[6] Mw = weight average molecular weight
[7] Mn = number average molecular weight

B. Preparation of White Pigmented Baking Enamel

The copolymer prepared in A above was formulated into a white baking enamel by blending in a one pint (237 ml) paint can be means of a high-shear mechanical disperser, known as a Cowels Dissolver, the following components.

| ENAMEL RECIPE | |
|---|---|
| Pigment Grind | |
| copolymer solution from A above | 146 g |
| Cymel ® 325*, curing agent | 42.6 g |
| n-butanol, solvent | 32.1 g |
| methyl amyl ketone, solvent | 17.4 g |
| Dow-Corning Paint additive #57 | 0.16 g |
| 20% p-toluenesulfonic acid in i-propanol | 0.11 g |
| TiPure R-902 TiO$_2$, pigment | 111 g |

*Cymel ® 325 is hexamethoxy methyl melamine commercially available from American Cyanamid Co.

| Diluent | |
|---|---|
| methyl amyl ketone | to provide the coating with a viscosity of 120 cp (0.12 Pa·s) |

C. Coating Substrate and Baking Enamel

The five enamels prepared as above were air-sprayed onto primed 24-gauge (0.7 mm) Bonderite 40 panels to give dry-film thicknesses of 1.5–2.0 mils (0.0381–0.0508 mm) after baking 20 minutes (1200 s) at 150° C. These coated panels were then exposed outdoors on a rack facing south and inclined 45° to the vertical, in Freeport, Tex. The panels were tested after twenty months' (51,840,000 s) exposure for gloss retention and after thirty months' (77,760,000 s) exposure for gloss retention and chalking. The results are given in the following Tables II and III. The thirty month (77,760,000 s) evaluation was more detailed than the twenty month (51,840,000 s) evaluation. The gloss measurements were taken as is, after rinsing with deionized water, and after washing with deionized water and a soft cotton cloth. Gloss measurements were made at both 60° and 20° C. The coatings were tested for chalking before rinsing and the forward impact resistance was measured for comparison to the original values.

TABLE II

| Hydroxy Alkyl Monomer | TWENTY MONTH EXPOSURE | | |
|---|---|---|---|
| | 60° Gloss | | Gloss Retention |
| | Initial | After 20 Mos. | % of Original |
| 2-HEA[1]* | 91 | 41 | 45 |
| 2-HPA[2]* | 93 | 38 | 41 |
| 2-HBA[3] | 91 | 63 | 69 |
| 2-HEMA[4]* | 92 | 61 | 66 |
| 2-HPMA[5]* | 92 | 58 | 63 |

*Not an example of the present invention
[1] 2-hydroxyethyl acrylate
[2] 2-hydroxypropyl acrylate
[3] 2-hydroxybutyl acrylate
[4] 2-hydroxyethyl methacrylate
[5] 2-hydroxypropyl methacrylate

TABLE III

| Property | THIRTY MONTH EXPOSURE | | | | |
|---|---|---|---|---|---|
| | 2-HEA[1]* | 2-HPA[2]* | 2-HBA[3] | 2-HEMA[4]* | 2-HPMA[5] |
| Original 60° Gloss, % | 88 | 92 | 94 | 92 | 92 |
| Gloss Retention, % | | | | | |
| 60° | | | | | |
| Unrinsed | 20 | 20 | 31 | 31 | 22 |
| Rinsed | 20 | 20 | 33 | 34 | 29 |
| Washed | 19 | 15 | 24 | 29 | 26 |
| 20° | | | | | |
| Rinsed | 3 | 4 | 6 | 12 | 10 |
| Washed | 2 | 3 | 3 | 9 | 7 |
| Chalking | slight | slight | slight | none | very slight |
| Forward Impact Resistance | | | | | |
| Original, in-lb/J | 16/1.81 | 12/1.36 | 14/1.58 | 16/1.81 | |
| Final, in-lb/J | 6/0.68 | 7/0.79 | 5/0.56 | 8/0.90 | 7/0.79 |

*Not an example of the present invention
[1] 2-hydroxyethyl acrylate
[2] 2-hydroxypropyl acrylate
[3] 2-hydroxybutyl acrylate
[4] 2-hydroxyethyl methacrylate
[5] 2-hydroxypropyl methacrylate

I claim:

1. In a composition comprising
   (I) from about 40 to about 80 percent by weight based on the combined weight of components (I) and (II) of a curable polymer resulting from polymerizing a monomer composition consisting of
   (A) from about 0 to about 40 percent by weight based upon the combined weight of components (I-A), (I-B), (I-C), (I-D), (I-E), (I-F) and (I-G) of at least one polymerizable monoethylenically unsaturated ester of a saturated aliphatic or aromatic monocarboxylic acid;
   (B) from about 30 to about 60 percent by weight based upon the combined weight of components (I-A), (I-B), (I-C), (I-D), (I-E), (I-F) and (I-G) of at least one polymerizable alkyl or aryl ester of a monoethylenically unsaturated monocarboxylic acid;
   (C) from about 10 to about 40 percent by weight based upon the combined weight of components (I-A), (I-B), (I-C), (I-D), (I-E), (I-F) and (I-G) of at least one polymerizable hydroxyalkyl ester of a monoethylenically unsaturated monocarboxylic acid;
   (D) from about zero to about 3 percent by weight based upon the combined weight of components (I-A), (I-B), (I-C), (I-D), (I-E), (I-F) and (I-G) of at least one polymerizable monoethylenically unsaturated monocarboxylic acid free of ester groups;
   (E) from about zero to about 15 percent by weight based upon the combined weight of components (I-A), (I-B), (I-C), (I-D), (I-E), (I-F) and (I-G) of acrylonitrile, methacrylonitrile or mixture thereof;
   (F) from about zero to about 20 percent by weight based upon the combined weight of components (I-A), (I-B), (I-C), (I-D), (I-E), (I-F) and (I-G) of at least one polymerizable alkyl or aryl ester of a monoethylenically unsaturated dicarboxylic acid; and
   (G) from about zero to about 50 percent by weight based upon the combined weight of components (I-A), (I-B), (I-C), (I-D), (I-E), (I-F) and (I-G) of at least one polymerizable monoethylenically unsaturated aromatic monomer free of acid and ester groups; and
   (II) from about 20 to about 60 percent by weight based on the combined weight of components (I) and (II) of a suitable solvent or mixture of solvents; and the improvement which comprises employing 2-hydroxybutyl acrylate or 2-hydroxybutyl methacrylate or a combination thereof as at least a portion of component (C) in an amount such that at least about 75 equivalent percent of the hydroxyl groups contained in component (C) is derived from 2-hydroxybutyl acrylate, 2-hydroxybutyl methacrylate or a combination thereof.

2. A composition of claim 1 wherein
   (i) component (I) is present in an amount of from about 65 to about 75 percent by weight based on the combined weight of components (I) and (II);
   (ii) component (II) is present in an amount of from about 25 to about 35 percent by weight based on the combined weight of components (I) and (II);
   (iii) component (I-A) is present in an amount of from about zero to about 14 percent by weight based upon the combined weight of components (I-A), (I-B), (I-C), (I-D), (I-E), (I-F) and (I-G);
   (iv) component (I-B) is present in an amount of from about 40 to about 54 percent by weight based upon the combined weight of components (I-A), (I-B), (I-C), (I-D), (I-E), (I-F) and (I-G);

(v) component (I-C) is present in an amount of from about 25 to about 39 percent by weight based upon the combined weight of components (I-A), (I-B), (I-C), (I-D), (I-E), (I-F) and (I-G);

(vi) component (I-D) is present in an amount of from about 1 to about 2 percent by weight based upon the combined weight of components (I-A), (I-B), (I-C), (I-D), (I-E), (I-F) and (I-G);

(vii) component (I-E) is present in an amount of from about zero to about 14 percent by weight based upon the combined weight of components (I-A), (I-B), (I-C), (I-D), (I-E), (I-F) and (I-G);

(viii) component (I-F) is present in an amount of from about zero to about 14 percent by weight based upon the combined weight of components (I-A), (I-B), (I-C), (I-D), (I-E), (I-F) and (I-G); and (ix) component (I-G) is present in an amount of from about 20 to about 34 percent by weight based upon the combined weight of components (I-A), (I-B), (I-C), (I-D), (I-E), (I-F) and (I-G).

3. A composition of claim 2 wherein
(i) component (I-A) is vinyl acetate, vinyl propionate, vinyl benzoate, or mixture thereof; p1 (ii) component (I-B) is ethyl acrylate, n-butyl acrylate, i-butyl acrylate, 2-butyl acrylate, 2-ethylhexyl acrylate, methyl methacrylate, n-butyl methacrylate, octyl methacrylate, or mixture thereof;
(iii) component (I-C) is 2-hydroxybutyl acrylate, 2-hydroxybutyl methacrylate or combination thereof;
(iv) component (I-D) is acrylic acid, methacrylic acid, crotonic acid, vinyl benzoic acid, or mixture thereof;
(v) component (I-F) is diethyl maleate, dibutyl maleate, diethyl fumarate, dibutyl fumarate, or mixture thereof;
(vi) component (I-G) is styrene, α-methyl styrene, or mixture thereof; and
(vii) component (II) is selected from ketones, alcohols, glycol ethers, aromatic hydrocarbons, esters, glycol ether-esters, and mixtures thereof.

4. A composition of claim 3 wherein
(i) component (I-A) is vinyl acetate;
(ii) component (I-B) is n-butyl acrylate;
(iii) component (I-D) is acrylic acid;
(iv) component (I-E) is acrylonitrile;
(v) component (I-F) is dibutyl maleate;
(vi) component (I-G) is styrene and
(vii) component (I-C) is 2-hydroxybutyl acrylate.

5. An acrylic coating composition comprising (1) at least one polymer-containing composition of claim 1 and (2) a curing quantity of one or more curing agents for component (1).

6. An acrylic coating composition of claim 5 wherein said curing agent is a melamine-formaldehyde resin.

7. An acrylic coating composition of claim 6 wherein said curing agent is hexamethoxymethyl melamine.

8. An acrylic coating composition comprising (1) at least one polymer-containing composition of claim 2 and (2) a curing quantity of one or more curing agents for component (1).

9. An acrylic coating composition of claim 8 wherein said curing agent is a melamine-formaldehyde resin.

10. An acrylic coating composition of claim 9 wherein said curing agent is hexamethoxymethyl melamine.

11. An acrylic coating composition comprising (1) at least one polymer-containing composition of claim 3 and (2) a curing quantity of one or more curing agents for component (1).

12. An acrylic coating composition of claim 11 wherein sid curing agent is a melamine-formaldehyde resin.

13. An acrylic coating composition of claim 12 wherein said curing agent is hexamethoxymethyl melamine.

14. An acrylic coating composition comprising (1) at least one polymer-containing composition of claim 4 and (2) a curing quantity of one or more curing agents for component (1).

15. An acrylic coating composition of claim 14 wherein said curing agent is a melamine-formaldehyde resin.

16. An acrylic coating composition of claim 15 wherein said curing agent is hexamethoxymethyl melamine.

17. An article coated with one or more layers of an acrylic coating composition of claim 5.

18. An article coated with one or more layers of an acrylic coating composition of claim 6.

19. An article coated with one or more layers of an acrylic coating composition of claim 7.

20. An article coated with one or more layers of an acrylic coating composition of claim 8.

21. An article coated with one or more layers of an acrylic coating composition of claim 9.

22. An article coated with one or more layers of an acrylic coating composition of claim 10.

23. An article coated with one or more layers of an acrylic coating composition of claim 11.

24. An article coated with one or more layers of an acrylic coating composition of claim 12.

25. An article coated with one or more layers of an acrylic coating composition of claim 13.

26. An article coated with one or more layers of an acrylic coating composition of claim 14.

27. An article coated with one or more layers of an acrylic coating composition of claim 15.

28. An article coated with one or more layers of an acrylic coating composition of claim 16.

* * * * *

UNITED STATES PATENT AND TRADEMARK OFFICE
CERTIFICATE OF CORRECTION

PATENT NO. : 4,654,398

DATED : March 31, 1987

INVENTOR(S) : Russell T. McFadden

It is certified that error appears in the above-identified patent and that said Letters Patent is hereby corrected as shown below:

Col. 5, Table III, 8th line under heading "2-HEMA$^4$"; change "16/1.81" to --14/1.58--.

Col. 5, Table III, 8th line under heading "2-HPMA$^5$"; insert --16/1.81-- in the blank space.

Col. 7, line 23; delete "pl".

Col. 8, line 17; change "sid" to --said--.

Signed and Sealed this

Twenty-eighth Day of June, 1988

Attest:

DONALD J. QUIGG

*Attesting Officer*　　　　　　*Commissioner of Patents and Trademarks*